(12) United States Patent
McQueen

(10) Patent No.: US 7,281,966 B2
(45) Date of Patent: Oct. 16, 2007

(54) ANTLERED ANIMAL CALL

(76) Inventor: Roger McQueen, 401 Lincoln Ave., Cannon City, CO (US) 81212

( * ) Notice: Subject to any disclaimer, the term of this patent is extended or adjusted under 35 U.S.C. 154(b) by 0 days.

(21) Appl. No.: 11/031,770

(22) Filed: Jan. 7, 2005

(65) Prior Publication Data

US 2006/0154562 A1   Jul. 13, 2006

(51) Int. Cl.
  *A63H 5/00*  (2006.01)
(52) U.S. Cl. .................. 446/421; 446/397; 84/403
(58) Field of Classification Search ......... 446/397, 446/402, 418, 419, 421; 43/1; 84/402, 403, 84/404
See application file for complete search history.

(56) References Cited

U.S. PATENT DOCUMENTS

| | | | |
|---|---|---|---|
| 1,088,482 A | 2/1914 | Timmons | |
| 1,401,859 A | 12/1921 | Bailey | |
| 2,642,699 A | 6/1953 | Green | |
| 2,958,157 A | * 11/1960 | Tannehill | 446/397 |
| 4,366,956 A | 1/1983 | Kifferstein | |
| 4,606,733 A | 8/1986 | Willis | |
| 4,610,641 A | 9/1986 | Allen | |
| 4,850,928 A | 7/1989 | Stewart | |
| 4,988,325 A | * 1/1991 | Alderson et al. | 446/397 |
| 5,019,008 A | 5/1991 | Hughes | |
| 5,158,494 A | 10/1992 | Ball | |
| 5,334,074 A | 8/1994 | Suminski | |
| 5,555,664 A | 9/1996 | Shockley | |
| 5,813,899 A | 9/1998 | Hartley | |
| 5,928,056 A | 7/1999 | Molotschko | |
| 6,003,261 A | 12/1999 | French | |
| 6,227,927 B1 | * 5/2001 | Smith | 446/192 |
| 6,231,418 B1 | 5/2001 | Hancock et al. | |
| 6,234,865 B1 | 5/2001 | Battey | |
| 6,312,309 B1 | 11/2001 | Ocwieja | |
| 6,328,626 B1 | 12/2001 | Eubanks | |
| 6,676,479 B1 | * 1/2004 | Zimmerman | 446/397 |
| 2002/0058457 A1 | 5/2002 | Butler | |

* cited by examiner

*Primary Examiner*—Kien Nguyen
(74) *Attorney, Agent, or Firm*—Kinney & Lange, P.A.

(57) ABSTRACT

The present invention comprises a device for simulating the sound of rattling antlers. The device comprises a striker rod and a box. The striker rod comprises a head, a shaft and a handle. The box comprises a left and a right side wherein the left and right side each have a channel for receiving the head of the striker rod. The box also has a front and back side; and a top and bottom. The top has an opening to allow insertion of the shaft. The channels have nubs for impacting the head of the striker rod. When the head is reciprocated within the channels of the box, a simulated sound of rattling antlers is produced.

20 Claims, 8 Drawing Sheets

ANTLERED ANIMAL CALL

CROSS-REFERENCE TO RELATED APPLICATION(S)

BACKGROUND OF THE INVENTION

The present invention relates to calls for attracting wildlife. Specifically, the invention relates to calls for attracting antlered animals, such as elk and deer, by simulating the sound of rattling antlers.

Hunting seasons for antlered big game animals, particularly elk and deer, often take place in the fall during the mating season for these animals. During mating season male elk and deer are in rut. During the rut, males compete for dominance with each other by challenging each other for territorial rights and females. The competition for dominance often times reduces to a physical battle between competing males in which the animals spar using their antlers. Other males within the vicinity of sparring animals also seek to stake their claim to territory and females, and are attracted to the sounds of the sparring elk or deer, which might provide a chance to steal a mate. Hunters, of course, also attempt to attract curious elk or deer, particularly males with large antlers who seek to exert their dominance, by simulating the sound of sparring elk and deer. Thus, hunters will attempt to simulate the sound of rattling antlers in order to attract potential quarry.

Many forms of calls and devices have been developed in an attempt to simulate rattling antlers. Particularly, devices that simulate the actual structure of an antler have been widely used. Two of these devices can be struck against each other to simulate rattling antlers. These devices are made of materials that attempt to simulate the qualities of real antlers. There are several associated drawbacks with simulated antler calls. Because they simulate actual antlers, they are bulky and take up much of the limited space hunters have available. Once a hunter has set up in a hunting spot, these types of calls are also difficult to handle and manipulate due to their size. Also, because there are two antlers, two hands are needed to operate the call. This is particularly disadvantageous when a hunter needs to operate a bow or firearm. The commotion created by rattling and moving around two antlers and two arms creates an abundance of extra motion that can spook potential quarry. Also, this type of call is difficult to keep quiet when not in use due to the protruding tines. The large size of each antler and the many protruding tines make it difficult to stow away quickly and quietly. Any unwanted noise has the potential of scaring quarry away from the hunter.

Many other types of calls for simulating rattling antlers have been developed in an attempt to make a more compact and easily operable call. These have been disclosed in U.S. Pat. Nos. 5,158,494; 5,334,074; 6,234,865; and 6,328,626; and application No. 2002/0058457. These inventions also have the disadvantages discussed above and others.

There is a need, therefore, for a more effective call for simulating the sound of rattling antlers. Specifically, there is a need for a call that realistically reproduces the sound of rattling antlers, is easily and inconspicuously operated, remains quiet when not in use and is compact in size.

BRIEF SUMMARY OF THE INVENTION

The present invention comprises a device for simulating the sound of rattling antlers. The device comprises a striker rod and a box. The striker rod comprises a head, a shaft and a handle. The box comprises a left and a right side wherein the left and right side each have a channel for receiving the head of the striker rod. The box also has a front and back side; and a top and bottom. The top has an opening to allow insertion of the shaft. The channels have nubs for impacting the head of the striker rod. When the head is reciprocated within the channels of the box, a simulated sound of rattling antlers is produced.

DETAILED DESCRIPTION

Figure 1:
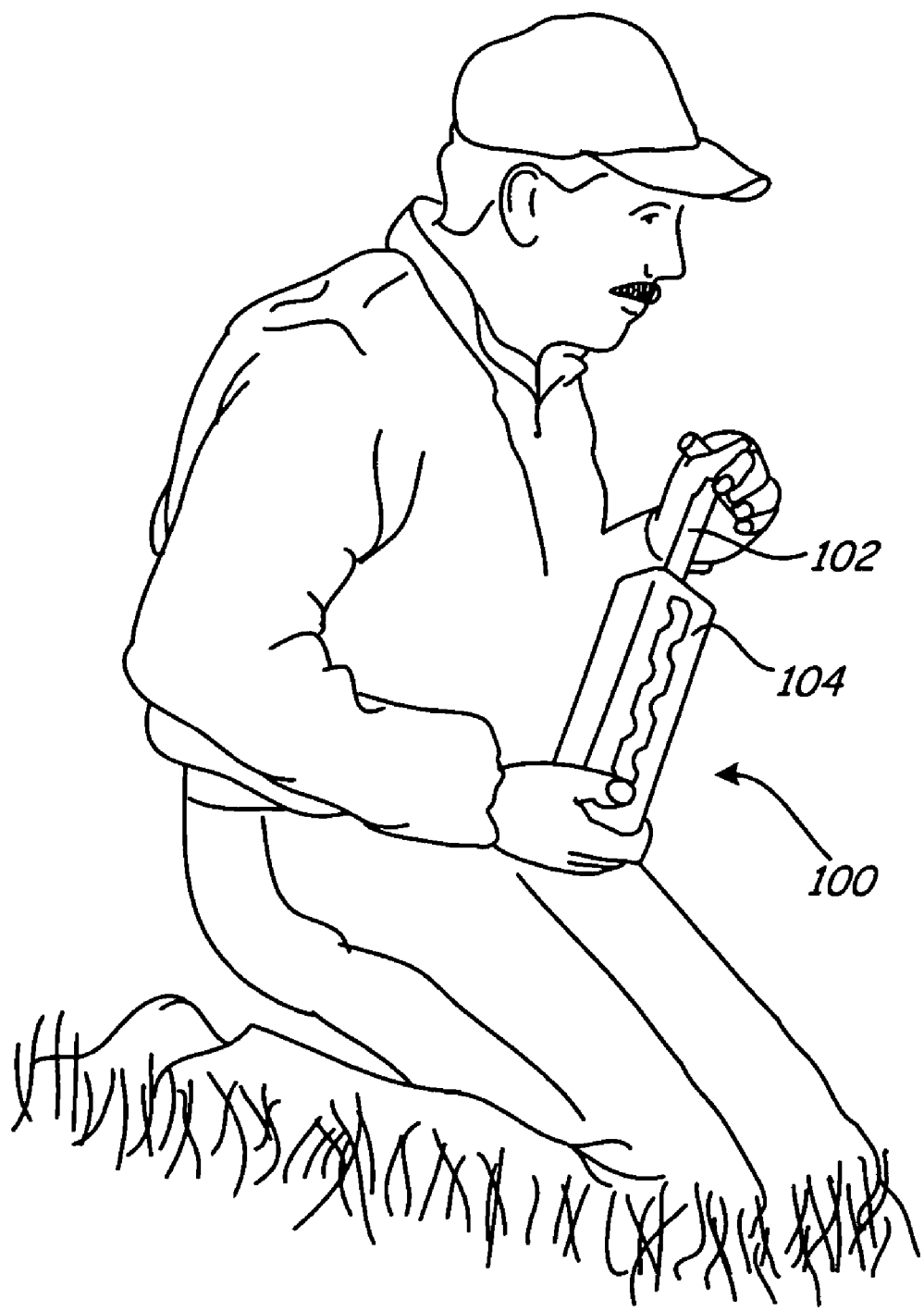
FIG. 1 shows a call constructed according to the present invention being operated.

FIG. 1 shows a call 100 constructed according to the present invention being operated. Call 100 comprises striker rod 102 and box 104. Striker rod 102 is inserted into an end of box 104. When striker rod 102 is reciprocated in and out of box 104, a striker rod head engages nubs located on side channels of box 104 in order to produce sounds that simulate the rattling of antlers.

Figure 2:
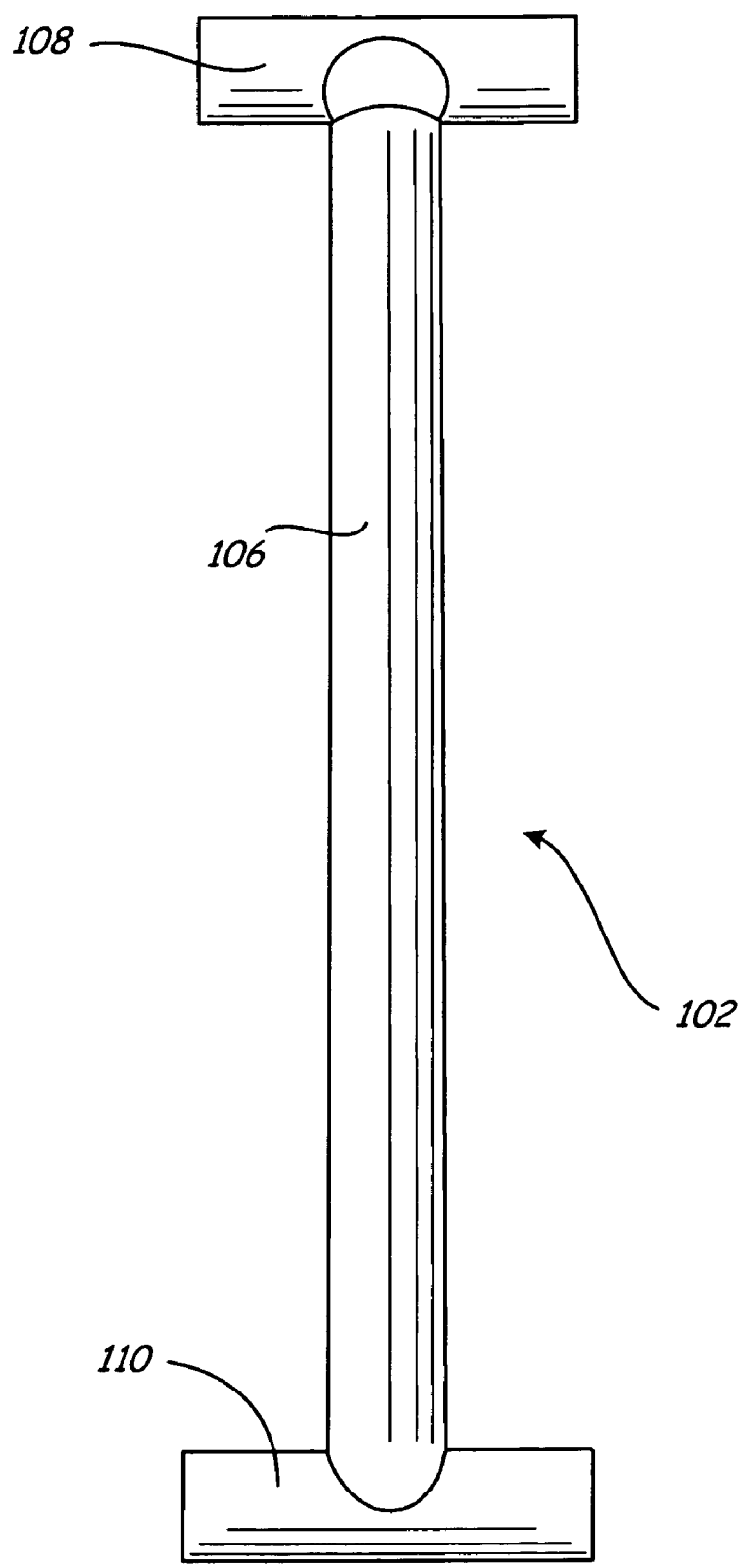
FIG. 2 shows the striker rod of the call.

FIG. 2 shows striker rod 102 of call 100. Striker rod 102 is comprised of shaft 106, handle 108 and head 110. Handle 108 is designed to be gripped by the operator of call 100. Head 110 is designed to engage nubs located on side channels of box 104. Shaft 106 connects handle 108 and head 110.

Figure 3:
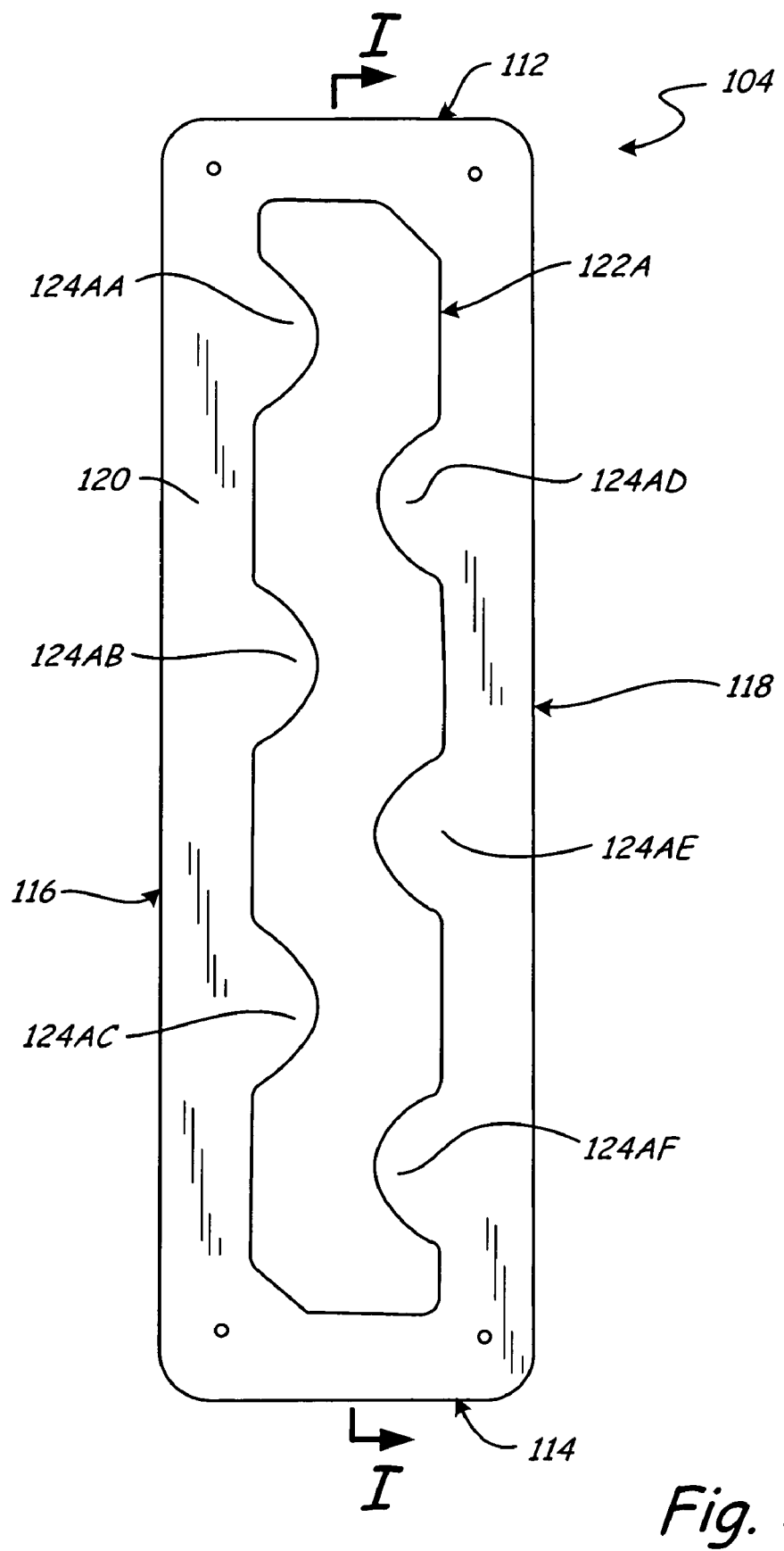
FIG. 3 shows a right side view of the box of the call.

FIG. 3 shows a side view of box 104 of call 100. Box 104 comprises top 112 and bottom 114; front side 116 and back side 118; right side 120 and left side 126 (shown in FIG. 4). Right side 120 contains channel 122A that includes nubs 124AA-124AF. Left side 126 also contains an identical channel having the same nub configuration.

Figure 4:
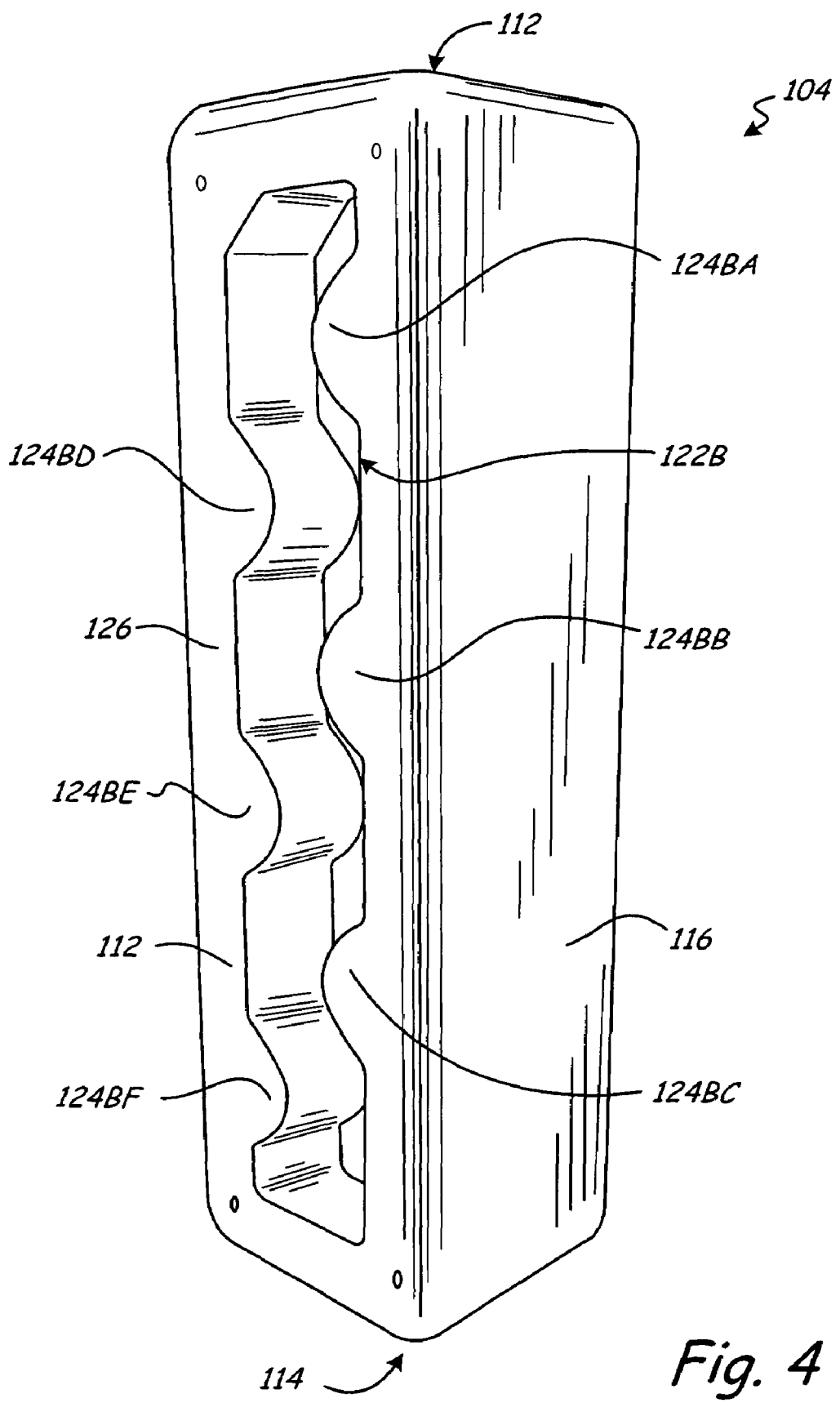
FIG. 4 shows a perspective view of a left side of the box of the call.

FIG. 4 shows a left side perspective view of box 104 of call 100. From this view, left side 126 can be seen. Left side 126 contains channel 122B comprising nubs 124BA-124BF. Front side 116 can also be seen. Back side 118 is identical to front side 116. Box 104 is generally described as a box having six sides. Box 104 could also be a frame having four sides whereby front side 116 and back side 118 would generally consist of an opening or void. In such a configuration, right side 120 and left side 126 would be held together by top 112 and bottom 114.

Figure 5:
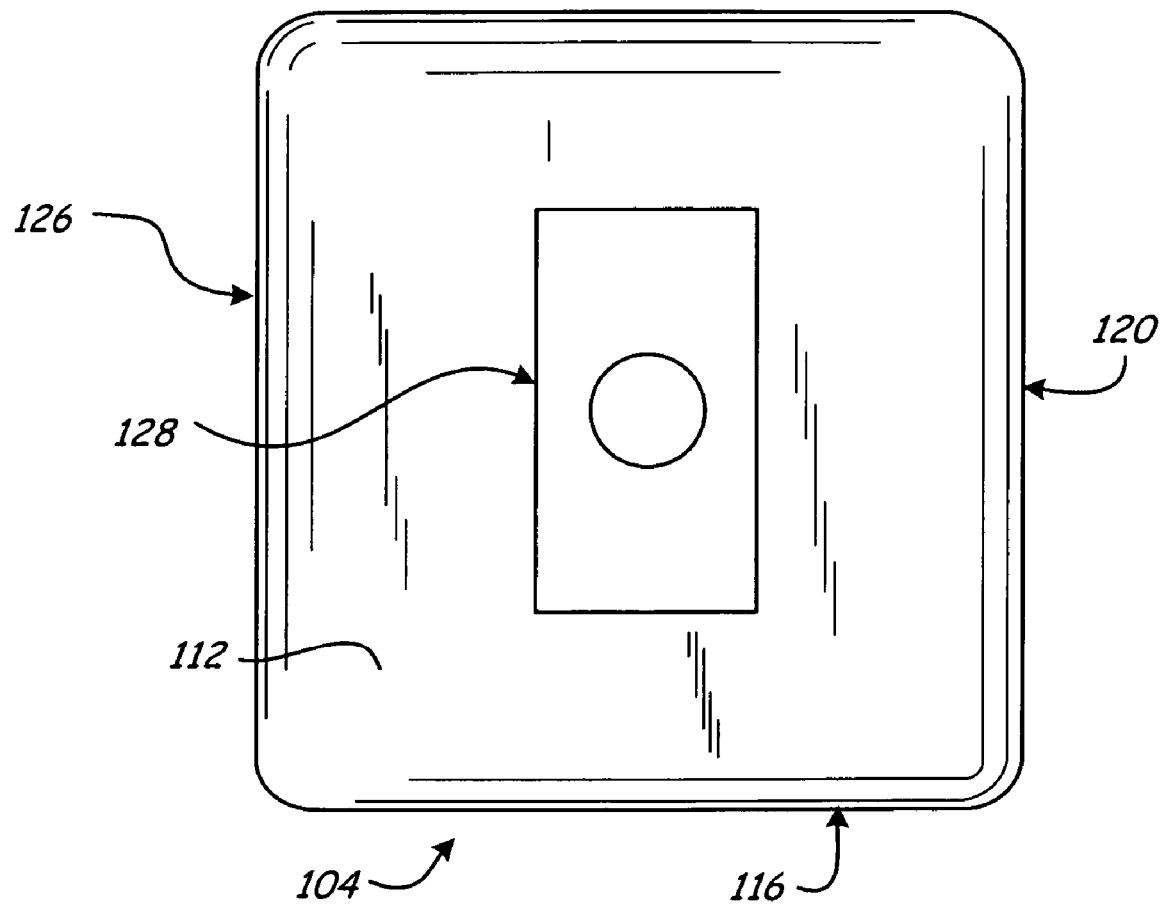
FIG. 5 shows a top view of the box of the call.

FIG. 5 shows top 112 of box 104 of call 100. Top 112 contains first opening 128. First opening 128 is designed to allow shaft 106 of an inserted striker rod 102 to travel freely so that head 110 can traverse channels 122A and 122B. In one embodiment, first opening 128 is rectangular in shape with the major axis being parallel to right side 120 and left side 126. First opening 128 is also small enough to prevent head 110 from passing through first opening 128. Thus, when fully assembled, striker rod 102 is prevented from becoming separated from box 104, and head 110 is prevented from becoming disengaged from channels 122A and 122B.

Figure 6:
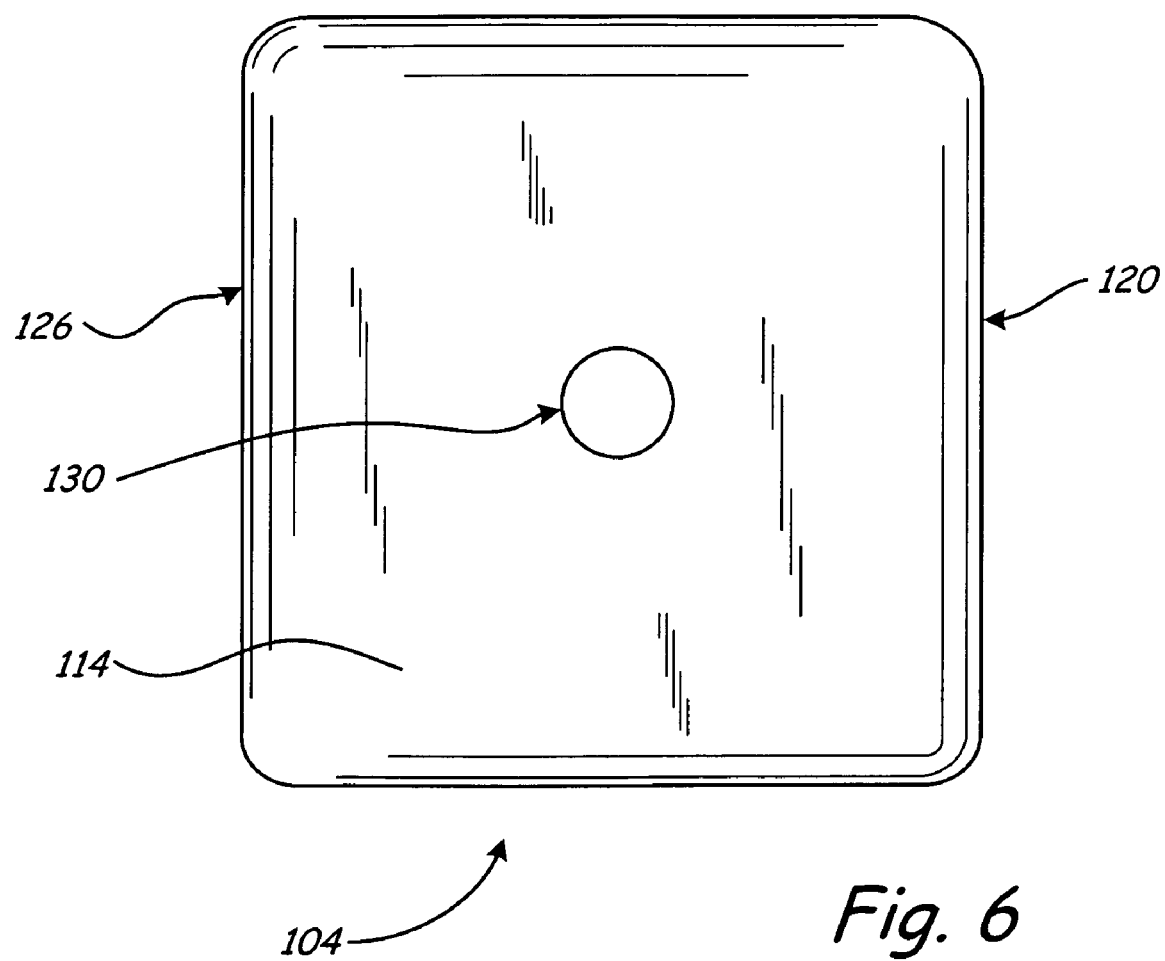
FIG. 6 shows a bottom view of the box of the call.

FIG. 6 shows bottom 114 of box 104 of call 100. Bottom 114 contains second opening 130. In one embodiment, second opening 130 is a small circular opening located in the center of bottom 114. Second opening 130 allows for insertion of a screw driver or other tool into box 104 in order to assist in fastening head 110 to shaft 106, which allows striker rod 102 to be inserted into box 104.

Figure 7:
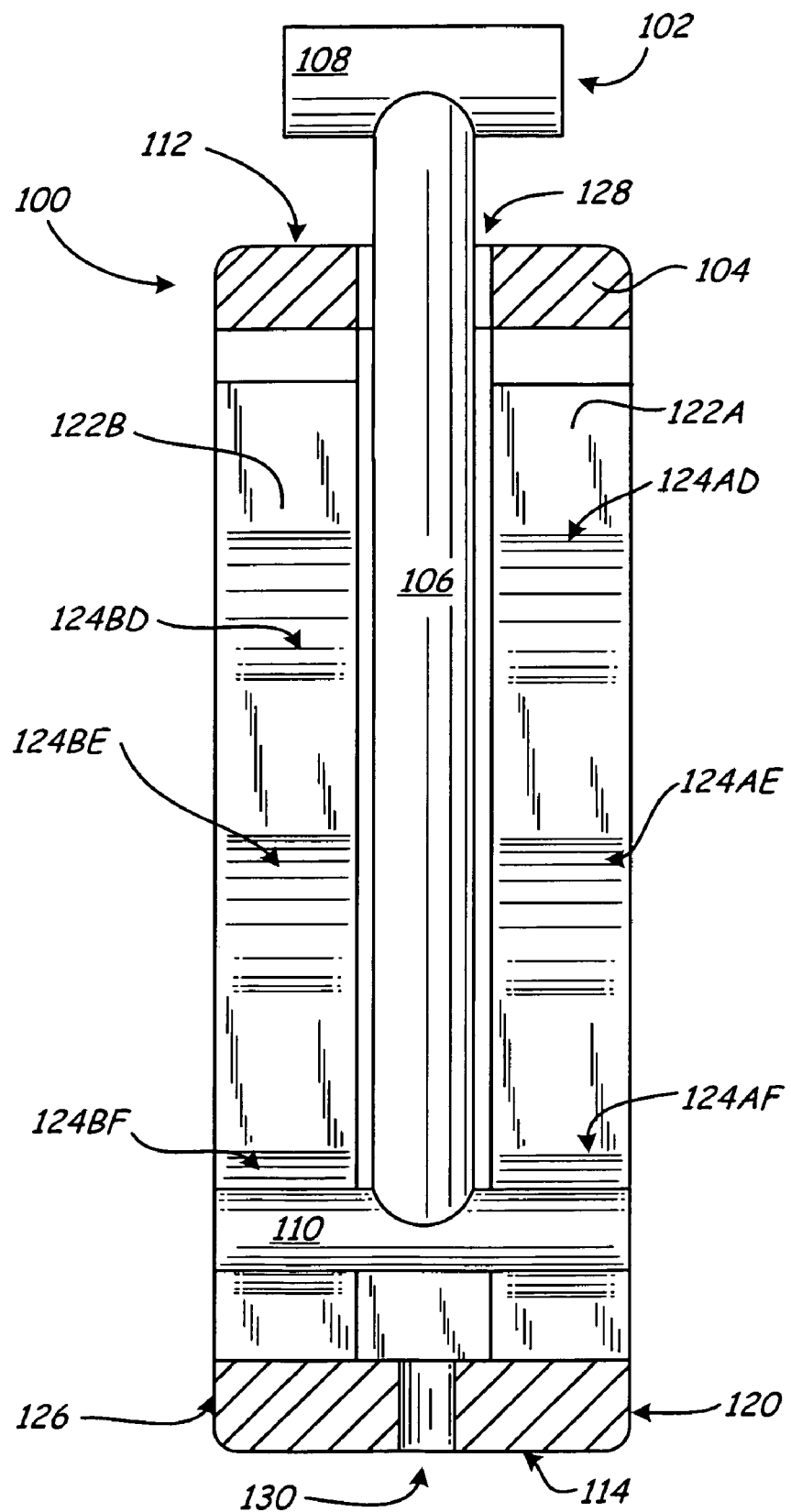
FIG. 7 shows cross section I-I of FIG. 3 of the box with the striker rod inserted.

FIG. 7 shows cross section I-I of FIG. 3 with striker rod 102 inserted into first opening 128. As shown, striker rod 102 is in the fully inserted position. Shaft 106 is long enough such that handle 108 extends beyond top side 112 enough to allow a user to grip handle 108. Shaft 106 can have any cross section that facilitates connecting head 110 and handle 108 without interfering with the reciprocation of striker rod 102 within box 104. In one embodiment, shaft 106 is cylindrical with a circular cross section. In one embodiment, shaft 106 is nearly as wide as the distance between channels 122A and 122B. Shaft 108 can be made of any suitable material that facilitates connecting head 110 and handle 108 and is strong enough to allow head 110 to strike nubs 122AA-122AF and 124BA-124BF without breaking. In one embodiment, shaft 106 is made of a composite wood material. In other embodiments, shaft 106 is made of plastic or wood.

Handle 108 can be shaped in any manner to facilitate gripping of striker rod 102 by an operator of call 100. In one embodiment, handle 108 is cylindrical with a circular cross section. Handle 108 can be made of any material suitable considering gripping and manufacturing concerns. In one embodiment, handle 108 is made of a wood composite material. In other embodiments, handle 108 is made of plastic or wood.

Head 110 rests in channels 122A and 122B between bottom side 114 and nubs 124BF and 124AF. Head 110 is wide enough to engage channels containing the nubs of box 104. In one embodiment, head 110 is nearly as wide as box 104. Head 110 is shaped to facilitate striking nubs of box 104 whereby the sound of rattling antlers is simulated. In one embodiment, head 110 is cylindrical in shape with a circular cross section. A cylindrically shaped head 110 facilitates movement of head 110 across nubs 122AA-122AF and 124BA-124BF, yet also allows head 110 to directly impact nubs 122AA-122AF and 124BA-124BF. In one embodiment, head 110 is composed of composite wood material. Any other material capable of realistically producing the sound of rattling antlers can also be used. In other embodiments wood or plastic is used.

Shaft 106 and handle 108 can be made of the same material as head 110 or of different materials. In one embodiment, shaft 106, handle 108 and head 110 are all cylindrical with a circular cross section, wherein they can all be manufactured from the same stock material.

The number of nubs used depends on the desired animal to be called. For elk, it is desirable to have more nubs because elk have larger antlers with more tines. For deer, it is desirable to have somewhat fewer nubs because deer have smaller antlers with less tines. Generally, for animals with larger antlers having more numerous tines, more nubs are used. In the embodiment shown used for elk, there are six nubs on each channel 122A and 122B. Nubs 124AD-124AF and 124BD-124BF are shown spaced evenly along the back side of channels 122A and 122B. Nubs 122AA-122AC and 124BA-124BC are spaced evenly on the opposing, front side of channels 122A and 122B so as to be positioned between nubs 122AD-122AF and 124BD-124BF. This arrangement allows head 110 to flow through channels 122A and 122B while striking nubs of the opposing channel walls alternately.

The overall dimensions of box 104 also depend on the desired animal to be called. For animals with larger antlers and more numerous tines, a bigger box 104 is used to accommodate more nubs. The size of box 104 also depends on the density of the antlers of the animal to be called. For animals with lower density antlers, such as elk, a larger box is used to produce a more hollow sounding rattle. Thus, for elk; a larger box is used to accommodate more nubs and to produce a more hollow sound. For calls intended to be used for deer, a relatively smaller box 104 is used because deer have less tines and more dense antlers. The overall size of call 100 is also somewhat compact. Call 100 can be easily transported and carried by hunters.

Figure 8:
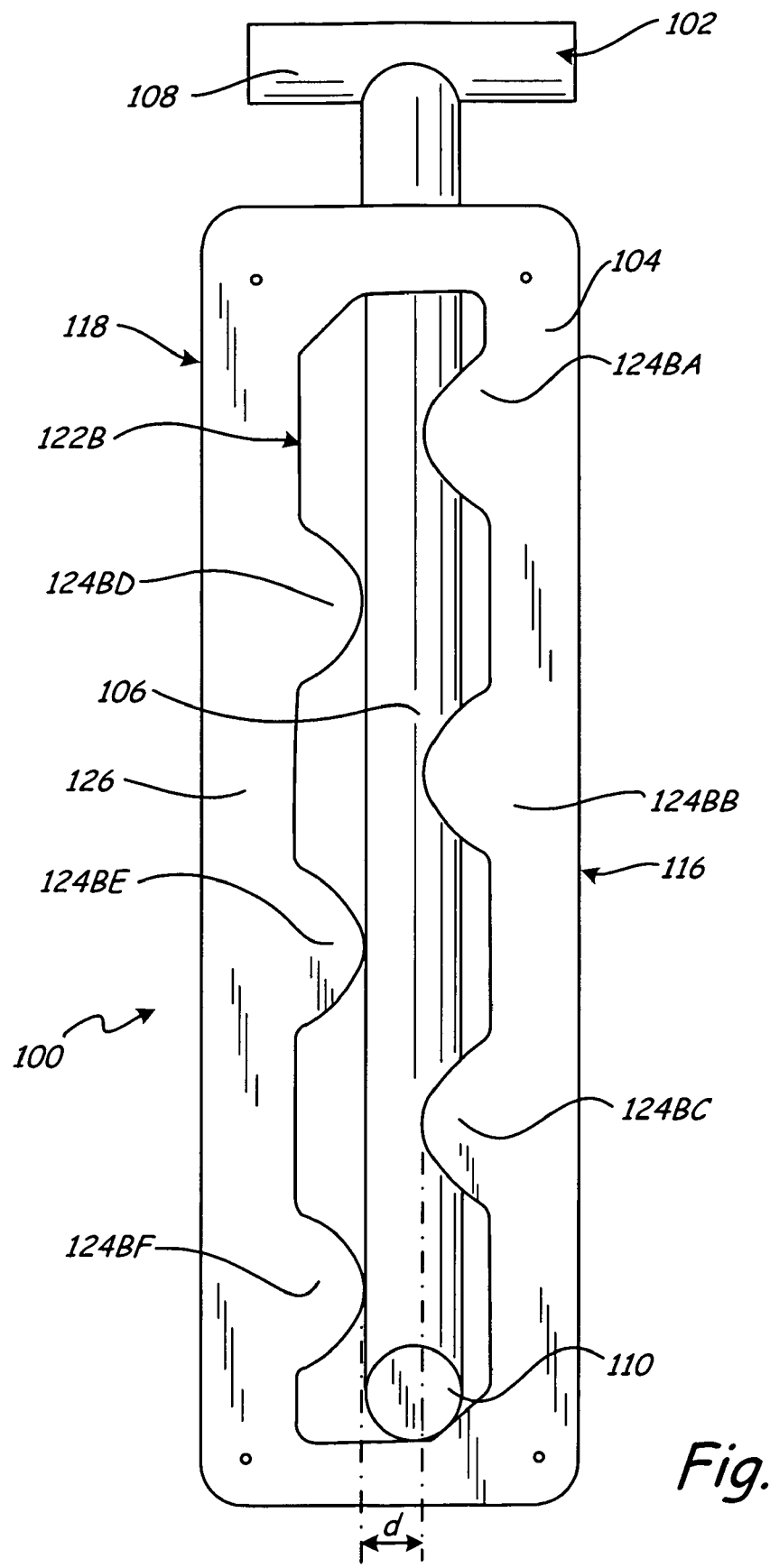
FIG. 8 shows a left side view of the box with the striker rod inserted.

FIG. 8 shows an assembled call 100 for simulating the sound of rattling antlers. The call 100 is comprised of box 102 and striker rod 104. Left side 126 of box 104 comprises channel 122B with nubs 124BA-124BF. The striker rod 102 is shown inserted into the box 104 with head 110 engaged in channel 122B. The cross section of head 110 is generally round in shape. This is to facilitate the passage of head 110 through channel 122B. Nubs 124BA-124BC are placed in intervals along the front side of channel 122B. Nubs 124BD-124BF are placed in intervals along back side of channel 122B. Nubs 124BA-124BF are also generally rounded for the purpose of facilitating the travel of head 110 through channel 122B.

During operation, striker rod 102 is moved from the fully inserted position shown, to a fully extended position. While striker rod 102 is in the motion of being extended, head 110 strikes nub 124BF and nub 124AF. The contoured shaping of nubs 124BF and 124AF and head 110 allow the striker rod 102 to fluidly travel through channels 122B and 122A. The spacing between the tip of opposing nubs 124BA-124BC on front side of channel 122B and the tip of nubs 124BD-124BF on back side of channel 122B are shown as distance d. In one embodiment, distance d is narrower than the diameter of head 110 to assist head 110 bouncing between opposing nubs as it traverses channel 122B. As striker rod 102 travels up channels 122A and 122B, head 110 continues to strike nubs 124BC and 124AC; nubs 124BE and 124AE; nubs 124BB and 124 AB; nubs 124BD and 124AD; and nubs 124BA and 124AA in sequence. Striker rod 102 can then be pushed back down through channels 122A and 122B to produce more rattling sounds. Striker rod 102 can be repeatedly reciprocated through channels 122A and 122B to simulate the sounds of two animals battling with antlers. This type of motion allows for easy one-handed operation of call 100. The motion is also compact, thus creating a small amount of commotion that can potentially spook quarry.

Call 100 can also be operated in a remote fashion to encourage elk or deer to approach the hunter more closely. It is advantageous to call for elk or deer from an elevated treestand in order to allow the sound produced by a call to travel farther, thereby gaining the attention of more animals. However, such far traveling sounds are more difficult for animals to pinpoint. Therefore, when the elk or deer eventually travel closer to the origination of the sound, it is advantageous to have the sound from the call originate closer to the ground to allow the origination point to be pinpointed by the animal. When the elk or deer has the origination point of the sound pinpointed, the animal is able to come closer to the origination point, which also allows the animal to come closer to the hunter. Call 100 can be easily operated by hand from an elevated treestand and remotely by rope at the bottom of a treestand. Call 100 can first be operated by hand by a hunter positioned in a tree stand to attract the attention of distant animals. As the animals approach closer, call 100 can be lowered down to ground level by rope. A rope can be affixed to handle 108 at one end and the hunter can control the other end. Box 104 is suspended from head 110 as call 100 is being lowered to the ground. Once box 104 is resting on the ground, striker rod 102 can be reciprocated by the hunter with the rope.

Although the present invention has been described with reference to preferred embodiments, workers skilled in the art will recognize that changes may be made in form and detail without departing from the spirit and scope of the invention.

The invention claimed is:

1. A device for simulating the sound of rattling antlers, the device comprising:
   a box comprising:
      a left side and a right side wherein the left and right side each have a channel having a plurality of nubs;
      a front side and back side; and
      a top and bottom, wherein the top side has an opening; and
   a striker rod comprising:
      a shaft extending into the box through the opening in the top; and
      a striker head connected to a lower end of the shaft for movement in the channels and impacting the nubs.

2. The device of claim 1 wherein there are six nubs for impacting the striker head on each channel.

3. The device of claim 1 wherein there are five nubs for impacting the striker head on each channel.

4. The device of claim 1 wherein the nubs are shaped to allow fluid motion of the striker head through the channels.

5. The device of claim 1 wherein the striker head is shaped to fit inside the channels of the left and right sides.

6. The device of claim 1 wherein the striker head is shaped to allow fluid travel within the channels of the left and right sides.

7. The device of claim 1 wherein the box and striker head are comprised of a material selected of the group consisting of composite wood material, wood and plastic.

8. The device of claim 1 wherein the striker rod further includes a handle connected to an upper end of the shaft.

9. The device of claim 1 wherein a tone of a sound produced by the striker head impacting the nubs is proportional to the size of the box.

10. The device of claim 1 wherein the bottom comprises an opening.

11. The device of claim 1 wherein the shaft of the striker rod comprises a rigid material selected of the group consisting of composite wood material, wood and plastic such that the striker head strikes the plurality nubs during movement in the channels.

12. An animal call comprising:
   a box having a first pair of opposing channels and a second pair of opposing channels, wherein the first and second pairs of opposing channels include a plurality of nubs, and the first and second opposing channels form a pathway; and
   a striker movable within the box, the striker having a striker head engaging and moveable in the pathway to create a simulated sound of raffling antlers by striking the plurality of nubs.

13. The animal call of claim 12 wherein the first and second opposing channels form a generally linear pathway.

14. The animal call of claim 12 wherein the striker is reciprocally moveable in the pathway.

15. The animal call of claim 12 wherein the striker further includes a handle.

16. The animal call of claim 12 wherein the plurality of nubs are shaped to allow fluid motion of the striker in the pathway.

17. The animal call of claim 12 wherein the plurality of nubs numbers six on each of the first and second channels.

18. The animal call of claim 12 wherein the plurality of nubs numbers five on each of the first and second channels.

19. The animal call of claim 12 wherein the box and striker are comprised of a material selected from the group consisting of composite wood material, wood and plastic.

20. The animal call of claim 12 wherein a tone of a sound produced by the striker head impacting the nubs is proportional to the size of the box.

* * * * *

UNITED STATES PATENT AND TRADEMARK OFFICE
CERTIFICATE OF CORRECTION

PATENT NO. : 7,281,966 B2 Page 1 of 1
APPLICATION NO. : 11/031770
DATED : October 16, 2007
INVENTOR(S) : Roger McQueen It is certified that error appears in the above-identified patent and that said Letters Patent is hereby corrected as shown below:

On the title page, item [56]
    Page under References Cited, delete
    "2,642,699 A 6/1953 Green" insert --2,642,699 A 11/1950 Green--

Column 6, Line 19, delete "raffling", insert --rattling--

Signed and Sealed this

Eleventh Day of March, 2008

JON W. DUDAS
*Director of the United States Patent and Trademark Office*